(12) United States Patent
Morisaki et al.

(10) Patent No.: US 12,087,141 B2
(45) Date of Patent: Sep. 10, 2024

(54) ATTACHMENT PROVISION CONTROL DEVICE, ATTACHMENT PROVISION CONTROL METHOD, AND RECORDING MEDIUM

(71) Applicant: NEC Corporation, Tokyo (JP)

(72) Inventors: Mitsunori Morisaki, Tokyo (JP); Shinichiro Sato, Tokyo (JP); Hiroki Sugegaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 673 days.

(21) Appl. No.: 17/419,992

(22) PCT Filed: Feb. 19, 2020

(86) PCT No.: PCT/JP2020/006429
§ 371 (c)(1),
(2) Date: Jun. 30, 2021

(87) PCT Pub. No.: WO2020/189155
PCT Pub. Date: Sep. 24, 2020

(65) Prior Publication Data
US 2022/0084347 A1     Mar. 17, 2022

(30) Foreign Application Priority Data

Mar. 15, 2019   (JP) .................. 2019-048564

(51) Int. Cl.
*G07F 9/02*          (2006.01)
*G06Q 30/0601*       (2023.01)

(52) U.S. Cl.
CPC ......... *G07F 9/023* (2013.01); *G06Q 30/0623* (2013.01); *G06Q 30/0641* (2013.01)

(58) Field of Classification Search
CPC .................................................... G07F 9/023
See application file for complete search history.

(56) References Cited

U.S. PATENT DOCUMENTS

| 10,134,069 B1 * | 11/2018 | Lake .................. G06F 16/2457 |
| 2015/0254758 A1 * | 9/2015 | Wadhawan ........ G06Q 30/0603 705/26.7 |

(Continued)

FOREIGN PATENT DOCUMENTS

| JP | 2003-288647 A | 10/2003 |
| JP | 2004-185320 A | 7/2004 |

(Continued)

OTHER PUBLICATIONS

International Search Report for PCT Application No. PCT/JP2020/006429, mailed on May 26, 2020.

(Continued)

*Primary Examiner* — Travis R Hunnings
(74) *Attorney, Agent, or Firm* — Sughrue Mion, PLLC

(57) ABSTRACT

An attachment provision control device according to the present invention includes: a memory; and at least one processor coupled to the memory. The processor performs operations. The operations include: acquiring information related to a purchased product and at least one of a purchase quantity and a purchase amount of the purchased product; determining at least one of a number and an amount of attachments to be attached to the purchased product based on the information related to the purchased product and at least one of the purchase quantity and the purchase amount of the purchased product; and transmitting an instruction to provide at least one of the determined number of attachments or the determined amount of attachments to an attachment provision device.

9 Claims, 10 Drawing Sheets

(56) References Cited

U.S. PATENT DOCUMENTS

2017/0091844 A1\* 3/2017 Yarvis ................ G06N 20/00
2022/0335489 A1\* 10/2022 Rao Karikurve .. G06Q 30/0603

FOREIGN PATENT DOCUMENTS

| JP | 2005-242846 A | 9/2005 |
| JP | 2005-300336 A | 10/2005 |
| JP | 2014-026576 A | 2/2014 |
| JP | 2017-211712 A | 11/2017 |
| JP | 2018-005814 A | 1/2018 |

OTHER PUBLICATIONS

English translation of Written opinion for PCT Application No. PCT/JP2020/006429, mailed on May 26, 2020.
JP Office Communicationn for JP Application No. 2021-507114, mailed on Mar. 26, 2024 with English Translation.

\* cited by examiner

ATTACHMENT PROVISION CONTROL DEVICE, ATTACHMENT PROVISION CONTROL METHOD, AND RECORDING MEDIUM

This application is a National Stage Entry of PCT/JP2020/006429 filed on Feb. 19, 2020, which claims priority from Japanese Patent Application 2019-048564 filed on Mar. 15, 2019, the contents of all of which are incorporated herein by reference, in their entirety.

TECHNICAL FIELD

The present disclosure relates to provision of an attachment attached to a product.

BACKGROUND ART

Products handled in retail stores (for example, convenience store, supermarket, or the like) include a product with an attachment such as a lunch box with chopsticks and a soy sauce. For example, patent literatures (PTLs) 1 and 2 disclose a technique for preventing forgetting to attach attachments when a product is sold. A product information output device described in PTL 1 displays a product and an article that is used at the same time as the product. A product registration processing device described in PTL 2 displays an attachment together with display of a product.

CITATION LIST

Patent Literature

[PTL 1] JP 2005-300336 A
[PTL 2] JP 2018-005814 A

SUMMARY OF INVENTION

Technical Problem

To attach an attachment by a clerk in a retail store causes a load in terms of work, and the techniques in PTLs 1 and 2 are insufficient for preventing forgetting to attach the attachments.

One object of the present disclosure is to provide an attachment provision control device or the like that can automatically provide at least one of an appropriate number of attachments and an appropriate amount of attachments.

Solution to Problem

An attachment provision control device according to one aspect of the present disclosure includes:
  a memory; and
  at least one processor coupled to the memory,
  the processor performs operations, the operations including:
  acquiring information related to a purchased product and at least one of a purchase quantity and a purchase amount of the purchased product;
  determining at least one of a number and an amount of attachments to be attached to the purchased product based on the information related to the purchased product and at least one of the purchase quantity and the purchase amount of the purchased product; and
  transmitting an instruction to provide at least one of the determined number of attachments or the determined amount of attachments to an attachment provision device.

An attachment provision system according to one aspect of the present disclosure includes:
  an attachment provision control device including:
    a memory; and
    at least one processor coupled to the memory,
    the processor performing operations, the operations including:
    acquiring information related to a purchased product and at least one of a purchase quantity and a purchase amount of the purchased product;
    determining at least one of a number and an amount of attachments to be attached to the purchased product based on the information related to the purchased product and at least one of the purchase quantity and the purchase amount of the purchased product; and
    transmitting an instruction to provide at least one of the determined number of attachments or the determined amount of attachments to an attachment provision device;
  the attachment provision device that provides the attachment based on the instruction received from the attachment provision control device; and
  a product identification device that identifies the purchased product and at least one of the purchase quantity and the purchase amount of the purchased product and transmits the information related to the purchased product and at least one of the purchase quantity and the purchase amount of the purchased product to the attachment provision control device.

An attachment provision control method according to one aspect of the present disclosure includes:
  acquiring information related to a purchased product and at least one of a purchase quantity and a purchase amount of the purchased product;
  determining at least one of a number and an amount of attachments to be attached to the purchased product based on the information related to the purchased product and at least one of the purchase quantity and the purchase amount of the purchased product; and
  transmitting an instruction to provide at least one of the determined number of attachments or the determined amount of attachments to an attachment provision device.

An attachment provision method according to one aspect of the present disclosure, in which
  an attachment provision control device
    acquires information related to a purchased product and at least one of a purchase quantity and a purchase amount of the purchased product,
    determines at least one of a number and an amount of attachments to be attached to the purchased product based on the information related to the purchased product and at least one of the purchase quantity and the purchase amount of the purchased product, and
    transmits an instruction to provide at least one of the determined number of attachments or the determined amount of attachments to an attachment provision device;
  the attachment provision device
    provides the attachment based on the instruction received from the attachment provision control device; and a product identification device
identifies the purchased product and at least one of the purchase quantity and the purchase amount of the purchased product, and
transmits the information related to the purchased product and at least one of the purchase quantity and the purchase amount of the purchased product to the attachment provision control device.

A non-transitory computer-readable recording medium according to one aspect of the present disclosure embodies a program, the program causing a computer to perform a method, the method including:

acquiring information related to a purchased product and at least one of a purchase quantity and a purchase amount of the purchased product;

determining at least one of a number and an amount of attachments to be attached to the purchased product based on the information related to the purchased product and at least one of the purchase quantity and the purchase amount of the purchased product; and transmitting an instruction to provide at least one of the determined number of attachments or the determined amount of attachments to an attachment provision device.

Advantageous Effects of Invention

An effect of the present disclosure is to provide at least one of an appropriate number of attachments and an appropriate amount of attachments to a customer.

EXAMPLE EMBODIMENT

Figure 1:
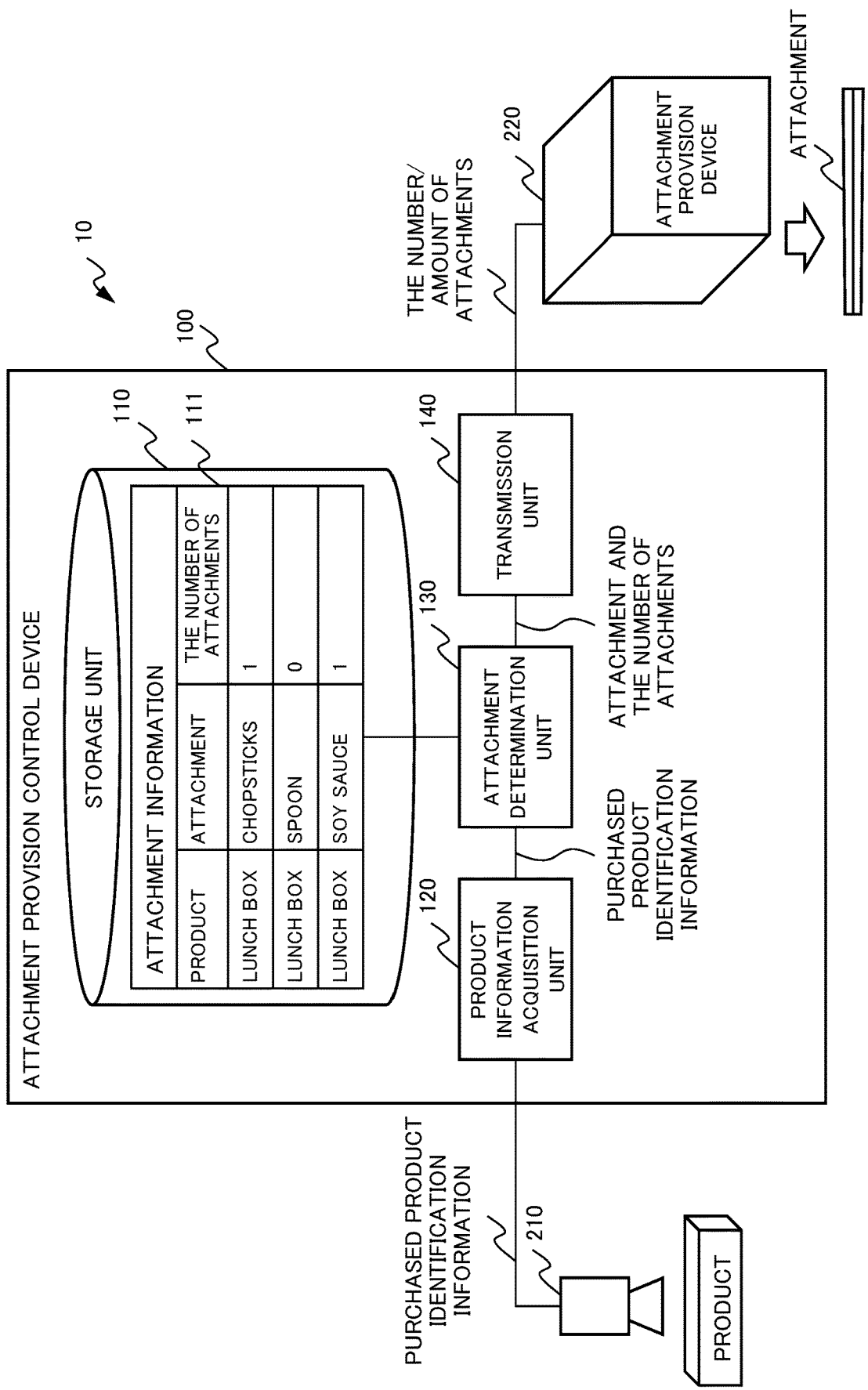
FIG. 1 is a block diagram illustrating a configuration of an attachment provision system according to a first example embodiment.

Example embodiments will be described in detail with reference to the drawings. In each drawing and each example embodiment described in the specification, the same component is denoted with the same reference numeral, and description thereof will be appropriately omitted.

First, terms used for description of each example embodiment below will be described.

A "purchased product" is a product purchased by a customer.

"Purchased product identification information" is information used to identify a purchased product in each example embodiment. The purchased product identification information includes information related to the purchased product and at least one of a purchase quantity of the purchased product and a purchase amount of the purchased product. The purchased product identification information may include other pieces of information.

A format of the information included in the purchased product identification information is not limited. For example, the information related to the purchased product in the purchased product identification information may be information indicating the purchased product (for example, name of purchased product or a product code (for example, JAN code)). However, the purchased product identification information is not limited to the above.

In each example embodiment, a method for acquiring the purchased product identification information is not limited. For example, each example embodiment may image the purchased product by using a camera and applies predetermined image recognition processing on the image acquired from the camera in such a way as to acquire the purchased product identification information. Alternatively, each example embodiment may use a barcode printed or attached on the purchased product. Alternatively, each example embodiment may use information stored in a radio frequency (RF) tag attached to the purchased product.

An "attachment" is an article attached to the purchased product.

For example, in a case where the purchased product is coffee, the following attachments are assumed as attachments.

(1) Items necessary for eating and drinking: spoons, straws, or the like.
(2) Items to adjust taste: sugar, cream, spices (for example, cinnamon), or the like.
(3) Items for carrying the purchased product: holders, sleeves, bags, or the like.

A form of the provision of the attachment is not limited. For example, forms for providing sugar include a form for specifying the number such as sugar cubes or a packed sugar and a form for specifying an amount such as a case where sugar is provided as a mixture with coffee. In each example embodiment, any form may be used as the form for providing the attachment.

The number and the amount of attachments to be attached to the purchased product do not need to be fixed. For example, there is a case where sugar which is one of the attachments of coffee is unnecessary, or there is a case where sugar of which an amount is larger than a normally attached amount is desired.

Moreover, the attachment is not limited to an article attached to food or beverage. For example, it is sufficient that the attachment be attached to the product to be purchased, such as a clothing bag and a hanger for cloth, a cable for a home electric appliance, or the like.

The attachment is not limited to an article such as a cable that is directly related to the purchased product. For example, the attachment may be a commemorative article or a premium for promotion.

Moreover, the attachment may be an article to which a provision period is set. For example, the attachment may be a premium that is attachment within a limited period.

The attachment may be an article that is attached to a combination of purchased products. For example, the attachment may be a premium for a product set.

The attachment is not limited to a free article and may be a paid article.

"Attachment information" is information used to determine an attachment to be attached to a purchased product. For example, the attachment information is information that includes a purchased product, an attachment attached to the purchased product, and at least one of the number and the amount of attachments to be attached in association with each other. The number of types of the attachments to be attached to the purchased product is not limited to one and may be plural. For example, in a case where the purchased product is a lunch box, chopsticks and napkins may be attached as the attachments.

In the following description, for convenience of description, there is a case where "at least one of the number and the amount of attachments" is collectively referred to as "the number of attachments".

"Attachment history information" is information regarding an attachment that has been attached by a customer in the past. For example, the attachment history information is a history regarding at least one of the number and the amount of attachments attached to the purchased product. More specifically, the attachment history information is information from which an attachment to be attached and at least one of the number and the amount of the attachments can be acquired on the basis of the customer and the purchased product.

An "attachment provision device" is a device that provides an attachment to a customer. A mechanism for providing the attachment by the attachment provision device is not limited. For example, the attachment provision device may be a device that stores attachments in each of a plurality of sections each having a door and is controlled by the attachment provision control device of each example embodiment to open the door. Alternatively, the attachment provision device may be a device that is controlled by the attachment provision control device of each example embodiment and conveys the necessary number of attachments to a takeout port.

The attachment provision device may be included or may be different from the attachment provision control device of each example embodiment. In a case where the attachment provision device is a device different from the attachment provision control device, a position where the attachment provision device is provided is not limited. For example, the attachment provision device may be provided near a point of sales (POS) terminal used for settlement by a customer, may be provided at a place different from the POS terminal in the store, or may be provided outside the store. In a case where the attachment provision device is provided at a place apart from the attachment provision control device such as outside of the store, the attachment provision device may acquire information that associates the attachment to be provided with the customer and determine the customer before providing the attachment.

In the following description, for convenience of description, the attachment provision device will be described as a device different from the attachment control device.

The single attachment provision device may be controlled by the plurality of attachment provision control devices. Alternatively, the plurality of attachment provision devices may be controlled by the single attachment provision control device.

First Example Embodiment

A first example embodiment will be described.

First, a configuration of an attachment provision system 10 according to the first example embodiment will be described.

FIG. 1 is a block diagram illustrating the configuration of the attachment provision system 10 including an attachment provision control device 100 according to the first example embodiment. The attachment provision system 10 includes the attachment provision control device 100, a product identification device 210, and an attachment provision device 220.

The product identification device 210 identifies a product (purchased product) purchased by a customer and transmits purchased product identification information to the attachment provision control device 100 on the basis of the identification result.

An identification method used by the product identification device 210 is not limited. For example, the product identification device 210 may identify the purchased product or the like by using image recognition. Alternatively, the product identification device 210 may identify the purchased product by using a barcode, an RF tag, or the like.

The attachment provision control device 100 acquires the purchased product identification information from the product identification device 210. Then, the attachment provision control device 100 transmits at least one of the number and the amount of attachments to the attachment provision device 220 to cause the attachment provision device 220 to provide the attachments to customers or the like. The attachment provision control device 100 may transmit other types of information to the attachment provision device 220. For example, the attachment provision control device 100 may transmit information indicating an attachment to be provided to the attachment provision device 220.

The attachment provision control device 100 may be included in any device. For example, a POS terminal in a store may include the attachment provision control device 100. Alternatively, a server that manages a store may include the attachment provision control device 100. Alternatively, a server of a management system that manages a plurality of stores may include the attachment provision control device 100.

The attachment provision device 220 provides the attachment on the basis of the information received from the attachment provision control device 100.

Next, a configuration of the attachment provision control device 100 will be described.

With reference to FIG. 1, the attachment provision control device 100 includes a storage unit 110, a product information acquisition unit 120, an attachment determination unit 130, and a transmission unit 140.

The storage unit 110 stores a product, an attachment to be attached to the product, and at least one of the number and the amount of attachments (the number of attachments) in association with each other. That is, the storage unit 110 stores the attachment information (attachment information 111 in FIG. 1). The storage unit 110 stores the attachment information 111 in advance. For example, an administrator of the attachment provision control device 100 makes the storage unit 110 store the attachment information 111 in advance. The storage unit 110 may be provided in a device outside the attachment provision control device 100. In this case, the attachment provision control device 100 does not include the storage unit 110, and it is sufficient for the attachment provision control device 100 to operate using information associated to the attachment information 111 in the external device (not illustrated).

The product information acquisition unit 120 acquires purchased product identification information (information related to purchased product and at least one of purchase quantity and purchase amount of purchased product) and sends the acquired purchased product identification information to the attachment determination unit 130.

The attachment determination unit 130 retrieves the attachment information 111 by using the received purchased product identification information, and outputs at least one of the number and the amount of attachments to be attached to the purchased product (that is, the number of attachments) to the transmission unit 140.

The transmission unit 140 transmits an instruction to the attachment provision device 220 to provide at least one of the number and the amount of attachments in such a way as to provide the received number of attachments.

The transmission unit 140 may transmit other types of information (for example, information indicating attachment) in addition to the number of attachments. For example, in a case where the attachment provision device 220 provides the plurality of types of attachments, the attachment provision device 220 requires the type of the attachment to be provided to be specified. Therefore, in such a case, the attachment determination unit 130 sends, in addition to the number of attachments, information for specifying the type of the attachment (for example, attachment name or identifier) to the transmission unit 140. Then, it is sufficient for the transmission unit 140 to transmit the information for specifying the type of the attachment to the attachment provision device 220, in addition to the number of attachments.

Moreover, the transmission unit 140 may communicate information necessary for control of the attachment provision device 220 (for example, commands and replies) to the attachment provision device 220.

On the basis of such a configuration, the attachment provision system 10 provides at least one of an appropriate number and an appropriate amount of attachments to the customer.

Next, an operation of the attachment provision control device 100 according to the first example embodiment will be described.

A timing when the operation of the attachment provision control device 100 starts is not limited. For example, the attachment provision control device 100 may detect completion of payment for the purchased product by the customer and start the operation. For example, the attachment provision control device 100 may detect that settlement at a POS terminal is completed, and then, start the operation.

Alternatively, the attachment provision control device 100 may start the operation in response to an instruction by a customer after purchase. For example, the POS terminal may display whether an attachment is needed at the time of settlement. In this case, it is sufficient for the attachment provision control device 100 to start the operation in a case where the POS terminal accepts "necessary".

Figure 2:
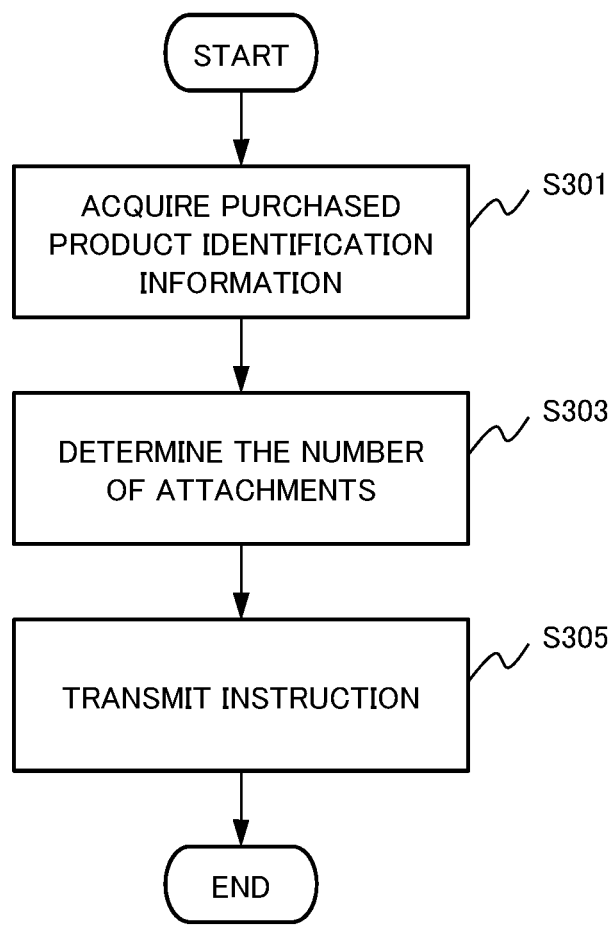
FIG. 2 is a flowchart illustrating an operation of an attachment provision control device according to the first example embodiment.

FIG. 2 is a flowchart illustrating the operation of the attachment provision control device 100 according to the first example embodiment.

The product information acquisition unit 120 of the attachment provision control device 100 acquires purchased product identification information related to a purchased product from the product identification device 210 (step S301).

The attachment determination unit 130 determines the number of attachments (at least one of the number of attachments and the amount of attachments) by using the attachment information 111 stored in the storage unit 110 and the received purchased product identification information (step S303).

An example of determination by the attachment determination unit 130 using the attachment information 111 illustrated in FIG. 1 will be described.

It is assumed that the attachment determination unit 130 receives purchased product identification information indicating that a purchased product is a lunch box.

In this case, the attachment determination unit 130 extracts a pair of an attachment of which the product is a lunch box and the number of attachments from the attachment information 111. In a case of FIG. 1, the extracted pairs of the attachment and the number of attachments include a pair of "attachment=chopsticks" and "the number of attachments=1", a pair of "attachment=spoon" and "the number of attachments=0", and a pair of "attachment=soy sauce" and "the number of attachments=1".

Here, the spoon of which the number of attachments is zero does not need to be attached. Therefore, the attachment determination unit 130 determines the number of attachments "1" of the attachment "chopsticks" and the number of attachments "1" of the attachment "soy sauce" on the basis of the extracted pairs.

The transmission unit 140 transmits an instruction to provide at least one of the determined number of attachments and the determined amount of attachments to the attachment provision device 220 (step S305).

As described above, the operation of the attachment provision control device 100 according to the first example embodiment is completed.

The attachment provision device 220 provides the received number of attachments.

Next, an effect of the first example embodiment will be described.

According to the first example embodiment, an effect can be achieved such that at least one of an appropriate number of attachments and an appropriate amount of attachments are provided to a customer.

The reasons are as follows.

The attachment provision control device 100 includes the storage unit 110, the product information acquisition unit 120, the attachment determination unit 130, and the transmission unit 140. The storage unit 110 stores the attachment information 111 that is information in which a product, an attachment attached to the product, and at least one of the number and the amount of attachments are associated with each other. The product information acquisition unit 120 acquires information related to a purchased product and at least one of a purchase quantity and a purchase amount of the purchased product. The attachment determination unit 130 determines at least one of a number and an amount of attachments attached to the purchased product based on the information related to the purchased product, at least one of the purchase quantity and the purchase amount of the purchased product, and the attachment information 111. The transmission unit 140 transmits an instruction to provide at least one of the determined number of attachments and the determined amount of attachments to the attachment provision device 220.

On the basis of the above configuration, the attachment provision control device 100 can control the attachment provision device 220 in such a way as to provide the attachment associated to the purchased product related to the purchased product identification information acquired from the product identification device 210.

That is, the attachment provision system 10 can provide at least one of the appropriate number of attachments and the appropriate amount of attachments associated to the purchased product identified by the product identification device 210 from the attachment provision device 220 to the customer on the basis of the configuration of the attachment provision control device 100.

Moreover, the attachment provision system 10 does not need an operation by a clerk or the like. That is, the attachment provision system 10 can automatically provide the attachment to the customer.

Regarding retail stores, introduction of a labor-saving store in which the number of employees who station in the store is reduced or an unattended store in which no employee stations (hereinafter, these are collectively referred to as "labor-saving store") using a computer system has been proceeded.

Generally, the labor-saving store is smaller than a normal store and has a limited sales area. Therefore, as compared with the normal store, it is necessary to narrow the number of stocks including attachments in the labor-saving store.

In a case where customers are responsible for the number of attachments to be acquired, there is a possibility that the customers acquire more attachments than needed.

As described above, the number of stocks of attachments is small in the labor-saving store. Therefore, when customers often excessively acquire the attachments in the labor-saving store, a shortage of the attachments occurs. Then, in the labor-saving store, it is not easy to replenish the attachments.

The attachment provision control device 100 provides an appropriate number of attachments with respect to the purchased product. Therefore, when the attachment provision control device 100 is applied to the labor-saving store, it is possible to reduce a frequency of the occurrence of the attachment shortage in the labor-saving store.

Next, an outline of the attachment provision control device 100 according to the first example embodiment will be described.

Figure 3:
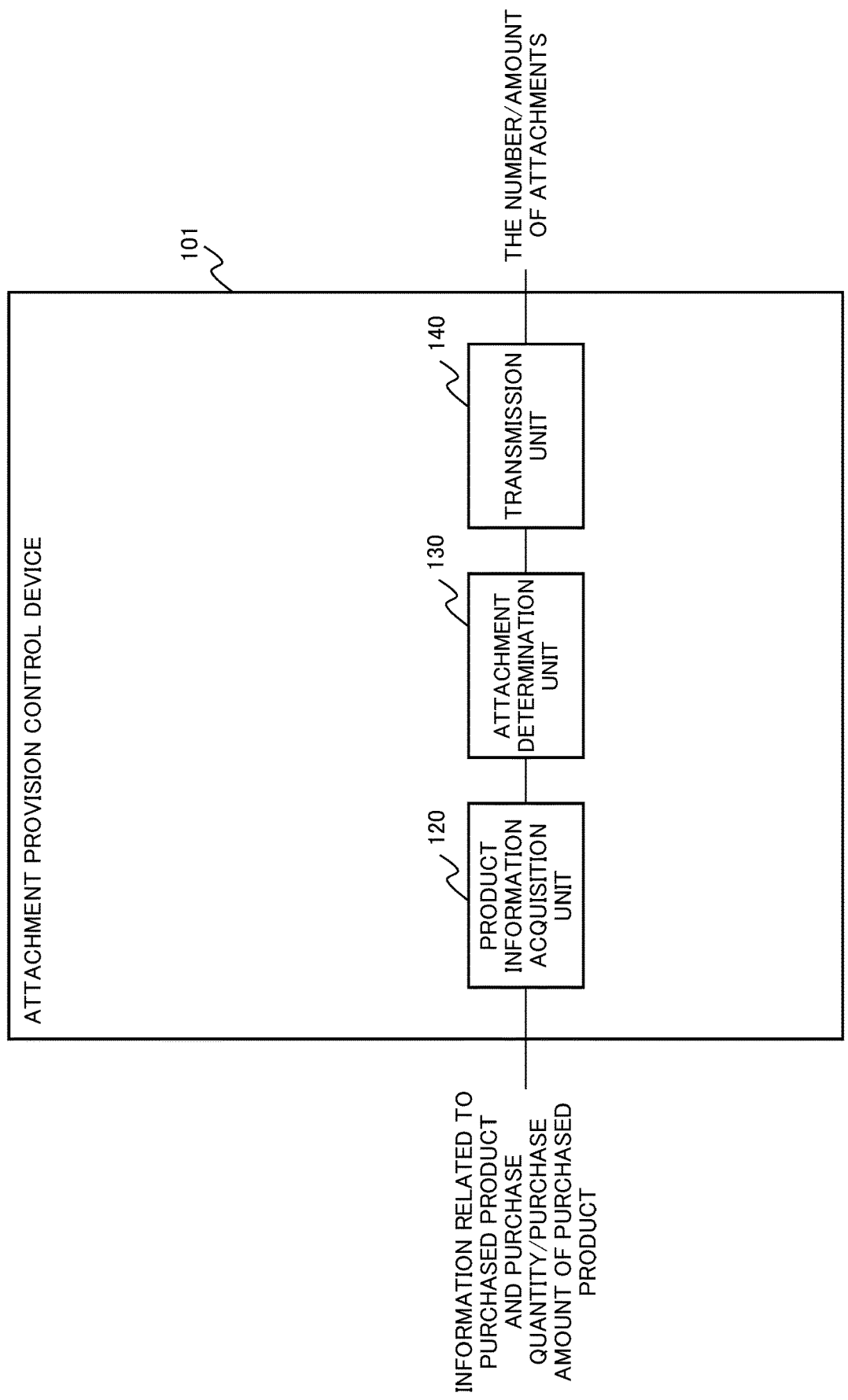
FIG. 3 is a block diagram illustrating an outline of an attachment provision device according to the first example embodiment.

FIG. 3 is a block diagram illustrating a configuration of an attachment provision control device 101 that is an outline of the attachment provision control device 100 according to the first example embodiment.

The attachment provision control device 101 includes a product information acquisition unit 120, an attachment determination unit 130, and a transmission unit 140. The product information acquisition unit 120 acquires information related to a purchased product and at least one of a purchase quantity and a purchase amount of the purchased product. The attachment determination unit 130 determines at least one of a number and an amount of attachments to be attached to the purchased product based on the information related to the purchased product and at least one of the purchase quantity and the purchase amount of the purchased product. The transmission unit 140 transmits an instruction to provide at least one of the determined number of attachments and the determined amount of attachments to the attachment provision device 220.

The attachment provision control device 101 configured in this way can achieve an effect similar to that of the attachment provision control device 100.

This is because each component of the attachment provision control device 101 similarly operates to the associating component in the attachment provision control device 100.

The attachment provision control device 101 has a minimum configuration of the first example embodiment.

Second Example Embodiment

There is a case where a customer desires to change the number or the amount of attachments. For example, some customers who purchase coffee do not use sugar. Some customers put in more milk than usual. It is desirable that the number and the amount of attachments to be provided can be changed.

Therefore, as a second example embodiment, an attachment provision control device 102 will be described that can change at least one of the number and the amount of attachments to be provided.

Figure 4:
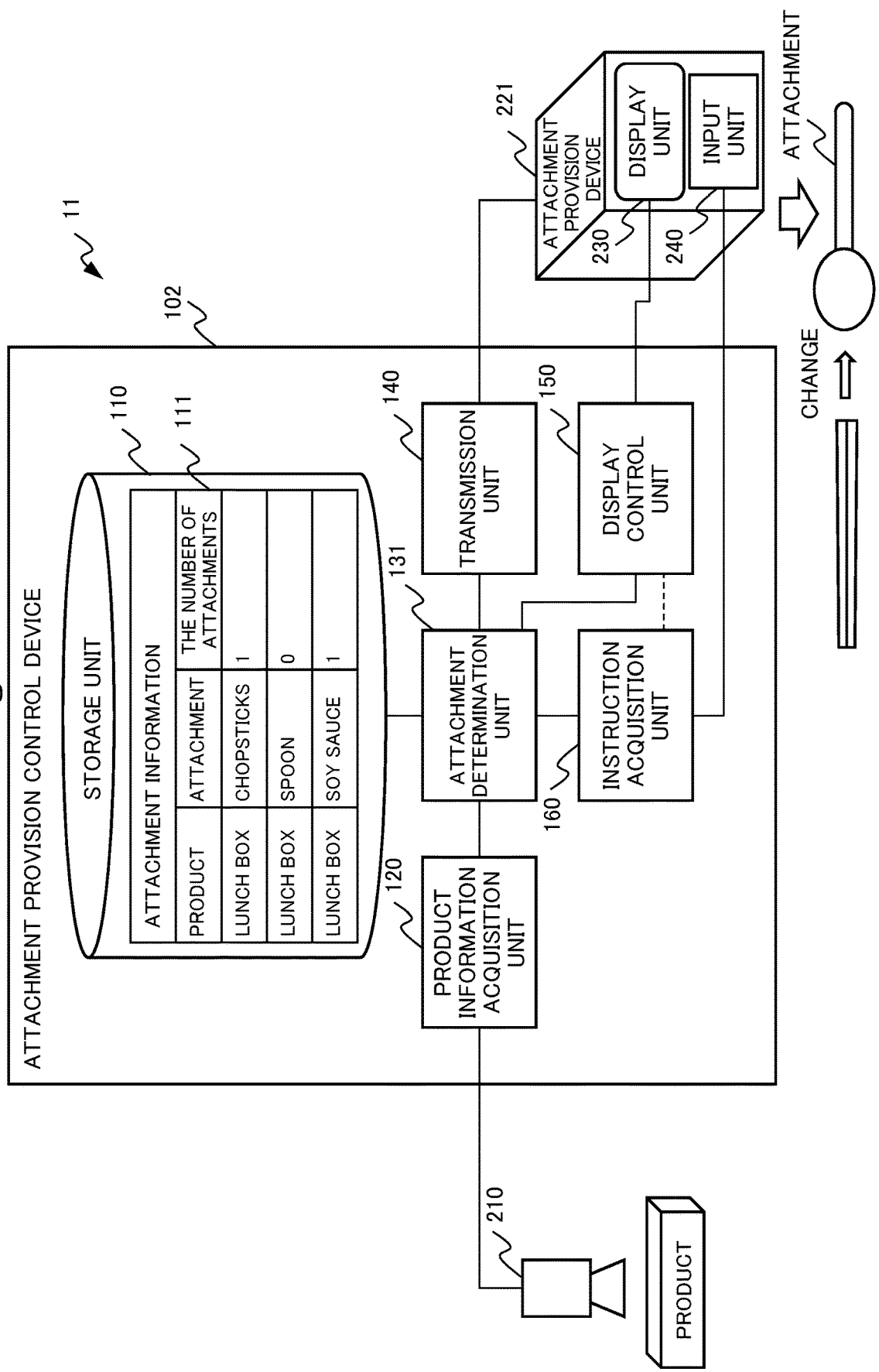
FIG. 4 is a block diagram illustrating a configuration of an attachment provision system according to a second example embodiment.

FIG. 4 is a block diagram illustrating a configuration of an attachment provision system 11 including the attachment provision control device 102 according to the second example embodiment. The attachment provision system 11 includes the attachment provision control device 102, a product identification device 210, and an attachment provision device 221.

The product identification device 210 is similar to that in the first example embodiment.

The attachment provision device 221 includes a display unit 230 and an input unit 240 in addition to the functions similar to those of the attachment provision device 220.

The display unit 230 displays an attachment to be provided to a customer. Specifically, the display unit 230 displays information to change at least one of the number and the amount of attachments (for example, image of attachment, name, and at least one of the number of attachments and amount of attachments).

The input unit 240 receives an input of an instruction to change the number of attachments. Moreover, the input unit 240 may receive an input of an instruction to change the attachment. Hereinafter, there is a case where these instructions are collectively referred to as an "instruction to change the number of attachments or the like".

Moreover, the input unit 240 receives an instruction to provide an attachment (hereinafter, referred to as "instruction to provide attachment") from the attachment provision device 221.

For convenience of the following description, the attachment provision device 221 includes the display unit 230 and the input unit 240. At least one of the display unit 230 and the input unit 240 may be included in a device different from the attachment provision device 221 (for example, attachment provision control device 102 or another device which is not illustrated).

However, the customer receives the attachment from the attachment provision device 221. Therefore, in consideration of customer's convenience, it is desirable that the display unit 230 and the input unit 240 be provided in the attachment provision device 221 or be provided near the attachment provision device 221.

The attachment provision control device 102 includes an attachment determination unit 131 instead of the attachment determination unit 130, as compared with the attachment provision control device 100 according to the first example embodiment. Moreover, the attachment provision control device 102 includes a display control unit 150 and an instruction acquisition unit 160. Other components are similar to those of the first example embodiment. Therefore, components related to the change of the attachment that is unique to the second example embodiment will be described in detail, and description of the components similar to those of the first example embodiment will be appropriately omitted.

The attachment determination unit 131 operates similarly to the attachment determination unit 130, determines at least one of the number and the amount of attachments associated to a purchased product, and sends the determined value to the display control unit 150.

The display control unit 150 controls the display unit 230 in such a way that the display unit 230 displays information regarding the attachment determined by the attachment determination unit 131 (for example, the number of attachments). The display control unit 150 may further control the display unit 230 in such a way that the display unit 230 displays information related to the attachment (for example, attachment name and image of attachment).

The instruction acquisition unit 160 acquires an instruction to change at least one of the number and the amount of attachments from the input unit 240. The instruction acquisition unit 160 may acquire the instruction to change the attachment.

The attachment determination unit 131 changes at least one of the number and the amount of attachments on the basis of the instruction to change at least one of the number and the amount of attachments acquired by the instruction acquisition unit 160. In a case of acquiring the instruction to change the attachment, the attachment determination unit 131 changes the attachment.

Then, the attachment determination unit 131 sends at least one of the number and amount of attachments that has been changed to the display control unit 150. In a case where the attachment is changed, the attachment determination unit 131 further sends information indicating the changed attachment to the display control unit 150.

The attachment determination unit 131 repeats the above operation until the instruction acquisition unit 160 acquires the instruction to provide the attachment from the input unit 240.

When the instruction acquisition unit 160 acquires the instruction to provide the attachment from the input unit 240, the attachment determination unit 131 sends the determined or changed number of attachments to the transmission unit 140. Specifically, the attachment determination unit 131 sends the instruction to provide at least one of the determined number of attachments, the determined amount of attachments, the changed number of attachments, and the changed amount of attachments to the transmission unit 140.

The transmission unit 140 transmits the instruction to provide at least one of the number of attachments and the amount of attachments received from the attachment determination unit 131 to the attachment provision device 221.

The attachment provision device 221 provides the attachments on the basis of at least one of the received number and amount of attachments.

However, the second example embodiment is not limited to the above. For example, the attachment provision device 221 may directly receive the instruction to provide the attachment from the input unit 240. In this case, the attachment provision device 221 may notify the attachment provision control device 102 of that the attachment has been provided.

Some customers do not need the attachments. Therefore, in a case where the instruction acquisition unit 160 does not acquire an instruction (case of no operation) even if a predetermined time has elapsed after start of display on the display unit 230 by the display control unit 150, the display control unit 150 may return the display on the display unit 230 to an initial screen. FIG. 4 illustrates a broken line between the display control unit 150 and the instruction acquisition unit 160 as connection for implementing this function.

The initial screen it not limited to predetermined display and includes display for reducing power consumption and turning off the light.

Alternatively, in a case where the attachment provision system 11 has a function for detecting a person (for example, human sensor), the display control unit 150 may control the display on the display unit 230 in consideration of movement of the person.

For example, the display control unit 150 stops the display on the display unit 230 in an initial state. Then, in a case where a person moves closer to one of the attachment provision device 221, the display unit 230, and the input unit 240, the display control unit 150 may start the display on the display unit 230. Moreover, in a case where a person moves away from the attachment provision device 221 or the like or in a case where a person goes out of the store, the display control unit 150 may stop the display on the display unit 230.

Alternatively, in a case where a movement of a person near the attachment provision device 221 (for example, movement of customer) or a change of a person (change to another customer) is detected, the display control unit 150 may change or stop the display on the display unit 230. A method for detecting the movement of the person or the change of the person is not limited. For example, in a case where a face authentication device is used, the display control unit 150 may determine that a change of a face authenticated by the face authentication device as the movement or the change of the person.

Next, a display example of a change of an attachment will be described with reference to the drawings.

Figure 5:
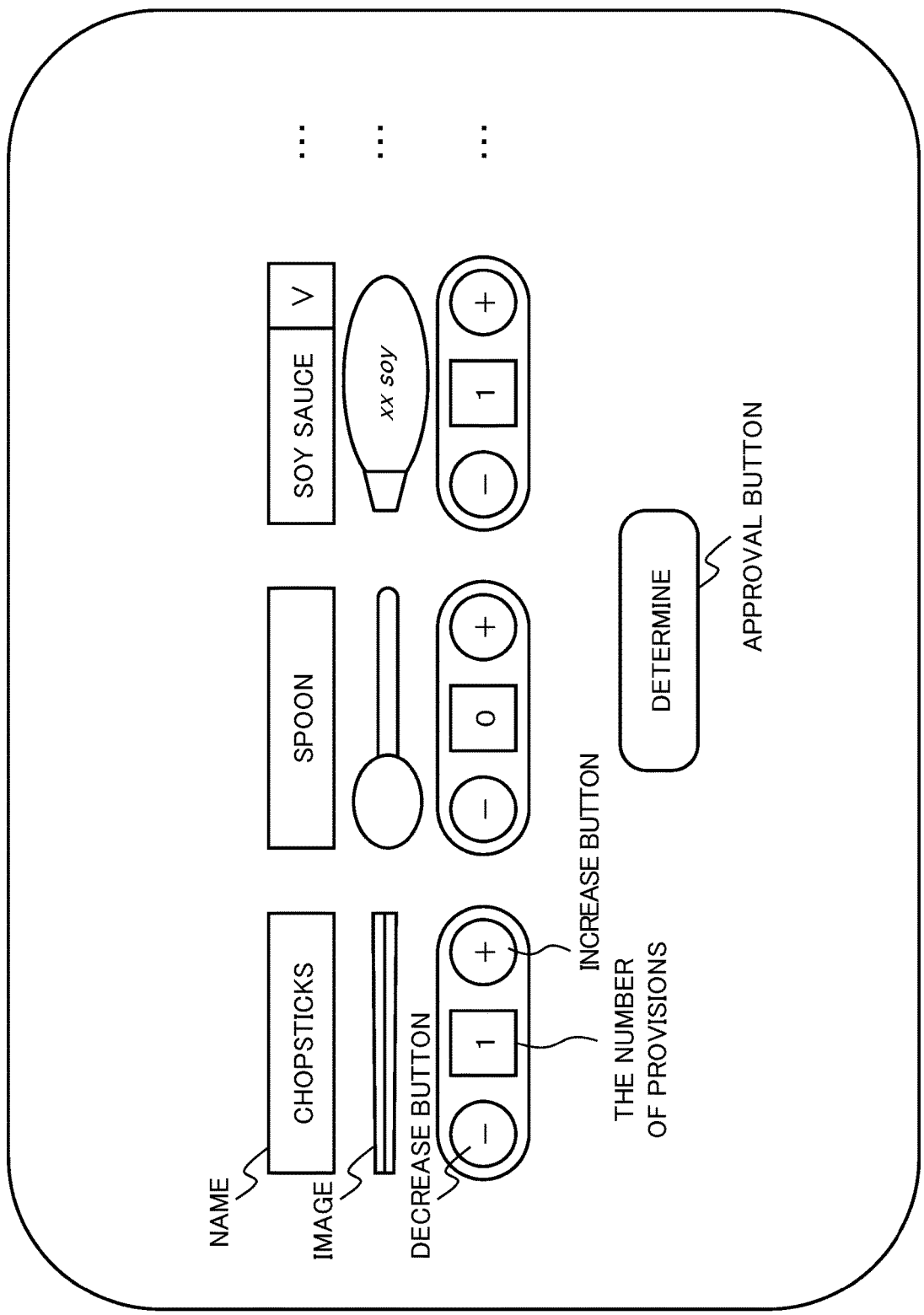
FIG. 5 is a diagram illustrating an example of display for changing the number of attachments.

FIG. 5 is a diagram illustrating an example of display for changing the number of attachments. The display illustrated in FIG. 5 is displayed, for example, on the display unit 230.

The display in FIG. 5 displays a name of an attachment, an image of the attachment, the number of attachments to be provided, a number increase instruction button ("+" button), and a number decrease instruction button ("−" button). Moreover, the display unit 230 displays a button to instruct provision of the attachments ("determine" button).

For example, in a case where the display unit 230 and the input unit 240 are implemented using a touch panel, a customer touches and operates the button illustrated in FIG. 5 with fingers or the like. For example, in a case where the number of soy sauces is increased, it is sufficient for the customer to touch the "+" button below an image of the soy sauce with the finger or the like. The input unit 240 detects a position of the contact with the customer's finger or the like and notifies the instruction acquisition unit 160 of an instruction associated to the position.

In a case where the number of attachments is the desired number, it is sufficient for the customer to touch the determine button. In this case, in a case where the position of the contact with the customer's finger or the like is the position of the determine button, the input unit 240 notifies the instruction acquisition unit 160 of an instruction to provide the attachments.

In a case where the display unit 230 is implemented using a display device of a computer or the like and the input unit 240 is implemented using a mouse or the like, FIG. 5 is display on the display device. For example, it is sufficient for the customer to operate the mouse to overlap a mouse pointer displayed on the display device on a button or the like and click a button of the mouse in this state.

Figure 6:
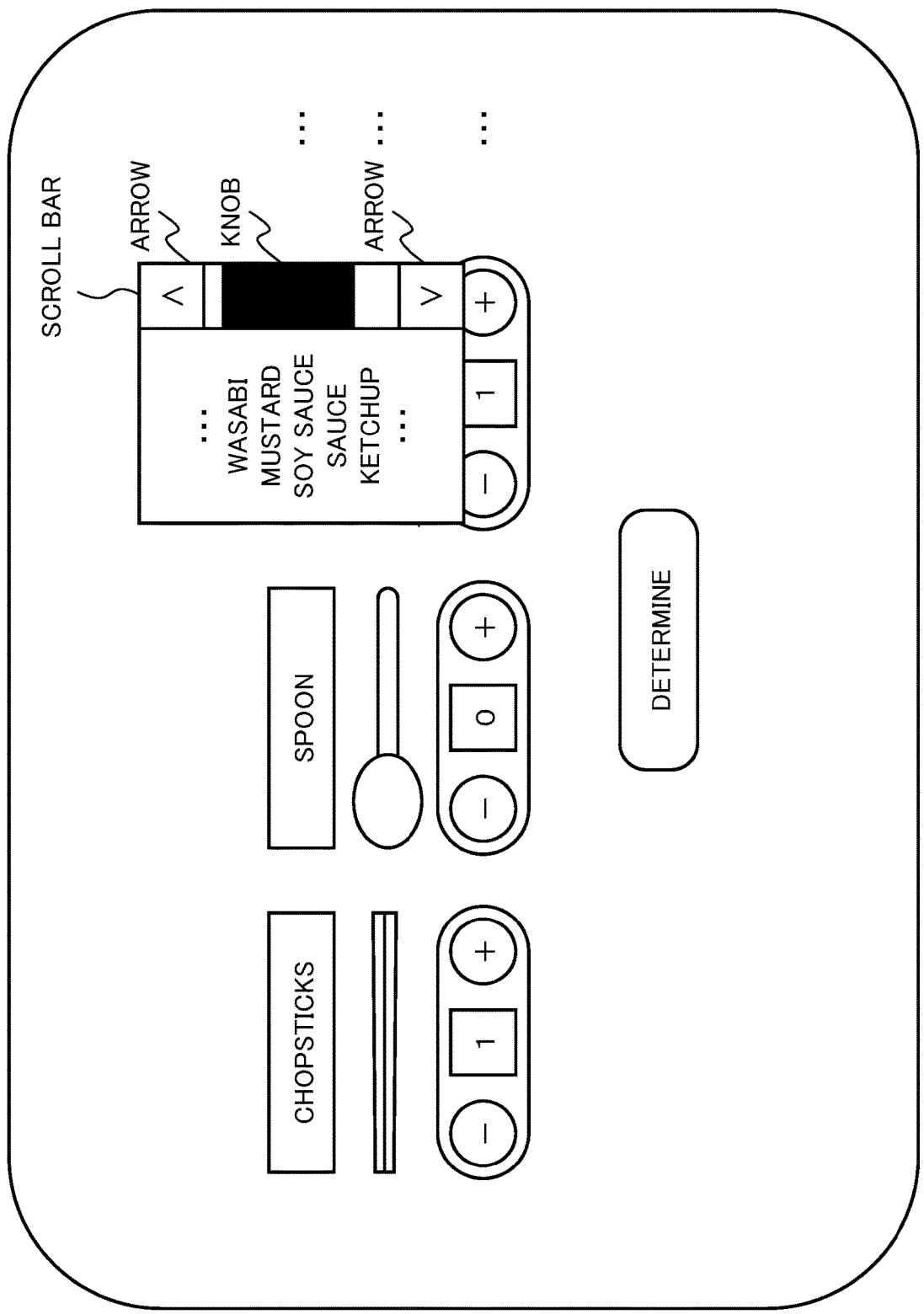
FIG. 6 is a diagram illustrating an example of display in a case where an attachment is changed.

FIG. 6 is a diagram illustrating an example of display in a case where an attachment is changed.

When the customer or the like touches the position of the name of the attachment, as illustrated in FIG. 6, a predetermined list of attachments (list of sauces in FIG. 6) is displayed. It is sufficient for the customer to touch a position of a name of a desired attachment. FIG. 6 illustrates arrows and a knob in a scroll bar as examples in a case where the number of attachments is large.

FIGS. 5 and 6 are examples of the display. The display control unit 150 may use display in other format as the display on the display unit 230.

The attachment determination unit 131 may provide a predetermined upper limit of at least one of the number and the amount of attachments to be provided. For example, in a case where an instruction to increase the number or the amount that exceeds the upper limit is received, it is sufficient for the attachment determination unit 131 to ignore the instruction to increase the number or the amount.

In a case where at least one of the number and the amount of attachments reaches the upper limit, the attachment determination unit 131 may instruct the display control unit 150 to stop the display to increase the associating value. For example, the display control unit 150 may stop the display to increase the value (for example, display of "+" button illustrated in FIG. 5) on the basis of the instruction.

Alternatively, in a case where at least one of the number and the amount of attachments reaches the upper limit, the attachment determination unit 131 may instruct the instruction acquisition unit 160 to stop receiving the instruction to increase the number or the amount.

In a case where at least one of the number and the amount of attachments falls below the upper limit, it is sufficient for the attachment determination unit 131 to return the operation of the display control unit 150 or the instruction acquisition unit 160 to a normal operation.

Next, an operation of the attachment provision control device 102 according to the second example embodiment will be described.

Figure 7:
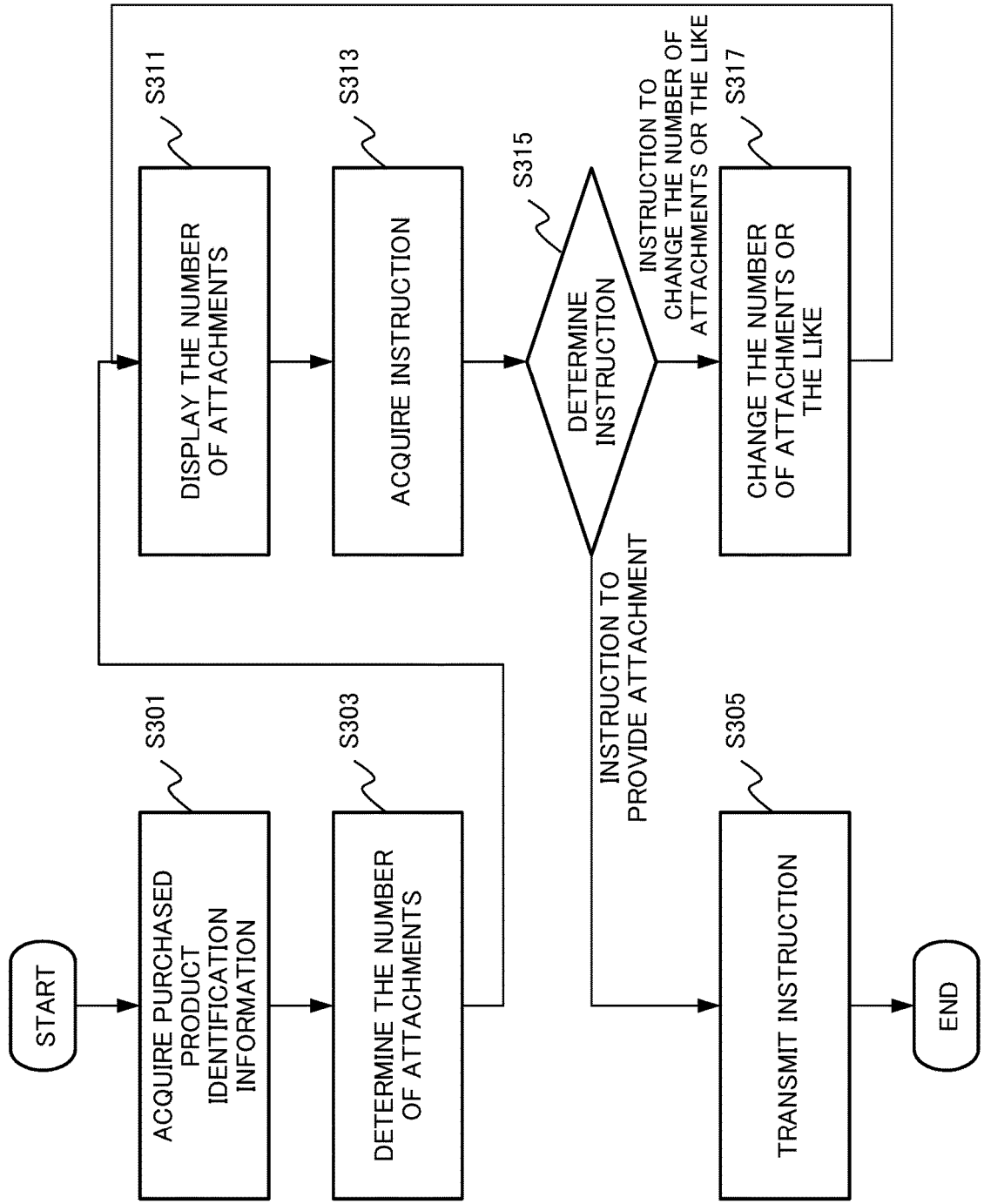
FIG. 7 is a flowchart illustrating an operation of an attachment provision control device according to the second example embodiment.

FIG. 7 is a flowchart illustrating the operation of the attachment provision control device 102 according to the second example embodiment.

The product information acquisition unit 120 of the attachment provision control device 102 acquires purchased product identification information related to a purchased product from the product identification device 210 (step S301).

The attachment determination unit 131 determines the number of attachments by using the attachment information 111 stored in the storage unit 110 and the received purchased product identification information (step S303).

The display control unit 150 displays the number of attachments (step S311). For example, the display control unit 150 controls the display unit 230 in such a way as to display the number of attachments.

The instruction acquisition unit 160 acquires an instruction (step S313). For example, the instruction acquisition unit 160 acquires the instruction from the input unit 240. Then, the instruction acquisition unit 160 sends the acquired instruction to the attachment determination unit 131.

The attachment determination unit 131 determines the instruction (step S315). More specifically, the attachment determination unit 131 determines whether the instruction is an instruction to change the number of attachments or the like or an instruction to provide the attachment.

In a case where the instruction is the instruction to change the number of attachments or the like, the attachment determination unit 131 changes the number of attachments or the like on the basis of the instruction (step S317). Then, the attachment provision control device 102 returns to step S307.

In a case where the instruction is the instruction to provide the attachment, the attachment determination unit 131 sends at least one of the determined or changed number of attachments and the determined or changed amount of attachments to the transmission unit 140.

The transmission unit 140 transmits an instruction to provide at least one of the determined number of attachments and the determined amount of attachments to the attachment provision device 221 (step S305).

As described above, the operation of the attachment provision control device 102 according to the second example embodiment is completed.

The attachment provision device 221 provides the received number of attachments.

Next, an effect of the second example embodiment will be described.

According to the second example embodiment, an effect for changing the number of attachments can be achieved, in addition to the effect of the first example embodiment.

The reasons are as follows.

The display control unit 150 displays at least one of the number and the amount of attachments on the display unit 230. The instruction acquisition unit 160 acquires, from the input unit 240, an instruction related to at least one of the provision of the attachment, the change of the attachment, the increase in the attachments, and the reduction of the attachments received by the input unit 240. Then, the attachment determination unit 131 changes at least one of the number and the amount of attachments on the basis of the acquired instruction.

This is because the attachment provision control device 102 can change the type of the attachment and at least one of the number and the amount of attachments in such a way as to cope with the displayed instruction to change the number of attachments on the basis of the configuration described above.

As a result, the attachment provision system 11 can provide an attachment desired by a customer without requiring an operation of a clerk.

Third Example Embodiment

A customer often desires at least one of attachments as many as and attachments of the same amount as purchased products. That is, by using at least one of histories of the number and the amount of attachments of the customer in the past, it is possible to provide at least one of a more appropriate number and a more appropriate amount of attachments.

Therefore, as a third example embodiment, an attachment provision control device 103 that determines the number of attachments or the like on the basis of the history will be described.

The attachment provision control device 103 may have functions associated to the attachment determination unit 131, the display control unit 150, and the instruction acquisition unit 160 described as the second example embodiment. However, in the following description, for convenience of description, a function regarding the history of the attachment will be described in detail.

Figure 8:
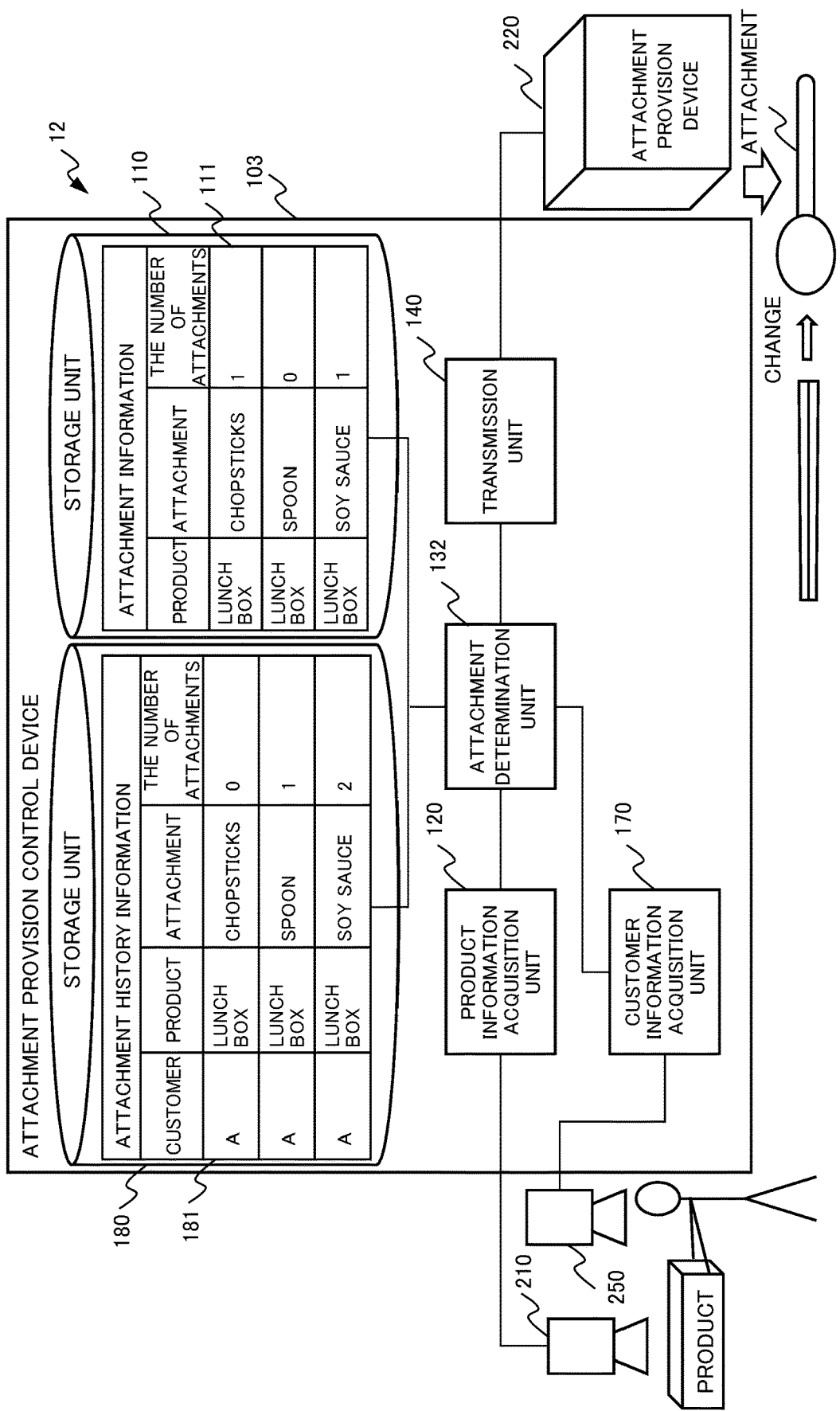
FIG. 8 is a block diagram illustrating a configuration of an attachment provision system according to a third example embodiment.

FIG. 8 is a block diagram illustrating a configuration of an attachment provision system 12 including the attachment provision control device 103 according to the third example embodiment. The attachment provision system 12 includes a product identification device 210, an attachment provision control device 103, an attachment provision device 220, and a customer identification device 250.

Because the product identification device 210 and the attachment provision device 220 are similar to those in the first example embodiment, detailed description will be omitted.

The customer identification device 250 identifies a customer who purchases a product and transmits the identification result (for example, customer identification information) to the attachment provision control device 103. A method for identifying a customer by the customer identification device 250 is not limited. For example, the customer identification device 250 may identify the customer by applying a predetermined image recognition method on an image captured using a camera or may read information stored in a portable article carried by a customer. The portable article is, for example, a device including an RF tag, an integrated circuit (IC) card, or the like.

The attachment provision control device 103 includes an attachment determination unit 132 instead of the attachment determination unit 130, as compared with the attachment provision control device 100 according to the first example embodiment. Moreover, the attachment provision control device 103 includes a customer information acquisition unit 170 and a storage unit 180. Other components are similar to those of the first example embodiment. Therefore, specific components of the third example embodiment will be described in detail, and description of the components similar to those of the first example embodiment will be omitted.

The storage unit 180 stores an attachment provided in the past and at least one of the number and amount of attachments (provided number), in association with each other, for a purchased product of each customer. More specifically, the storage unit 180 stores a customer, a product, an attachment, and at least one of the number and the amount of provided attachments in association with each other. That is, the storage unit 180 stores attachment history information ("attachment history information 181" in FIG. 8). The storage unit 180 stores the attachment history information 181 in advance. For example, an administrator of the attachment provision control device 103 makes the storage unit 180 store the attachment history information 181 in advance.

The storage unit 180 is a second storage unit with respect to the storage unit 110. However, the storage unit 180 may be provided in a device that is physically or logically different from the storage unit 110 or may be provided in the same device. For example, a single storage device may implement the functions as the storage units 110 and 180. The storage unit 180 may be provided in a device outside the attachment provision control device 103. In this case, the attachment provision control device 103 does not include the storage unit 180, and it is sufficient for the attachment provision control device 103 to operate using information associated to the attachment history information 181 in the external device (not illustrated).

The customer information acquisition unit 170 acquires information regarding a customer (for example, customer identification information) from the customer identification device 250 and sends the acquired information to the attachment determination unit 132.

The attachment determination unit 132 determines at least one of the number and the amount of attachments to be attached to the purchased product on the basis of the information regarding the purchased product and the information regarding the customer (pair of customer and purchased product) and the attachment history information 181.

An example of determination by the attachment determination unit 132 using the attachment history information 181 illustrated in FIG. 8 will be described.

First, it is assumed that the attachment determination unit 132 acquire a lunch box as the information regarding the purchased product. Moreover, it is assumed that the attachment determination unit 132 acquire a customer A as the information regarding the customer.

In this case, the attachment determination unit 132 extracts a pair of an attachment and the number of attachments associated to a pair of which "the purchased product is a lunch box" and "the customer is A" in the attachment history information 181. In a case of FIG. 8, the pairs of the attachment and the number of attachments include a pair of "attachment=chopsticks" and "the number of attachments=0", a pair of "attachment=spoon" and "the number of attachments=1", and a pair of "attachment=soy sauce" and "the number of attachments=2".

Here, the chopsticks, of which the number of attachments is zero, do not need to be attached. Therefore, the attachment determination unit 132 determines the number of attachments "1" of the attachment "spoon" and the number of attachments "2" of the attachment "soy sauce" on the basis of the extracted pairs.

In a case where the pair of the customer and the purchased product is not included in the attachment history information 181, the attachment determination unit 132 operates similarly to the attachment determination unit 130. That is, the attachment determination unit 132 determines the attachment associated to the purchased product and at least one of the number and the amount of attachments by using the attachment information 111 in the storage unit 110.

Then, the attachment determination unit 132 transmits the determined attachment and at least one of the number and the amount of attachments to the attachment provision device 220 via the transmission unit 140.

The example illustrated in FIG. 8 will be described as a specific example.

Referring to the attachment history information 181, in a history of a customer A, attachments of a lunch box are one spoon and two soy sauces. On the other hand, in the attachment information 111, attachments of a lunch box are one pair of chopsticks and one soy sauce. That is, FIG. 8 illustrates a case where the pair of chopsticks is changed to the spoon, and the number of soy sauces is increased for the customer A.

For example, in a case where the product information acquisition unit 120 acquires product information regarding the lunch box and the customer information acquisition unit 170 acquires information regarding the customer A, the attachment determination unit 132 determines one spoon and two soy sauces as the attachments.

Alternatively, in a case where the product information acquisition unit 120 acquires the product information regarding a lunch box and the customer information acquisition unit 170 acquires information regarding a customer who is not included in the attachment history information 181, the attachment determination unit 132 determines attachments by using the attachment information 111. In a case of FIG. 8, the attachment determination unit 132 determines one pair of chopsticks and one soy sauce as the attachments.

In a case where the attachment provision control device 103 has a function for displaying the attachments similarly to the attachment provision control device 102, the attachment provision control device 103 may display at least one of the number and the amount of attachments determined by the attachment determination unit 132. Moreover, the attachment provision control device 103 may display at least one of the information related to the attachment and the information related to the customer.

Alternatively, in a case where the attachment provision control device 103 has the function for changing the number of attachments or the like similarly to the attachment provision control device 102, the attachment determination unit 132 may update the attachment history information 181 by using the changed number.

Next, an operation of the attachment provision control device 103 according to the third example embodiment will be described.

Figure 9:
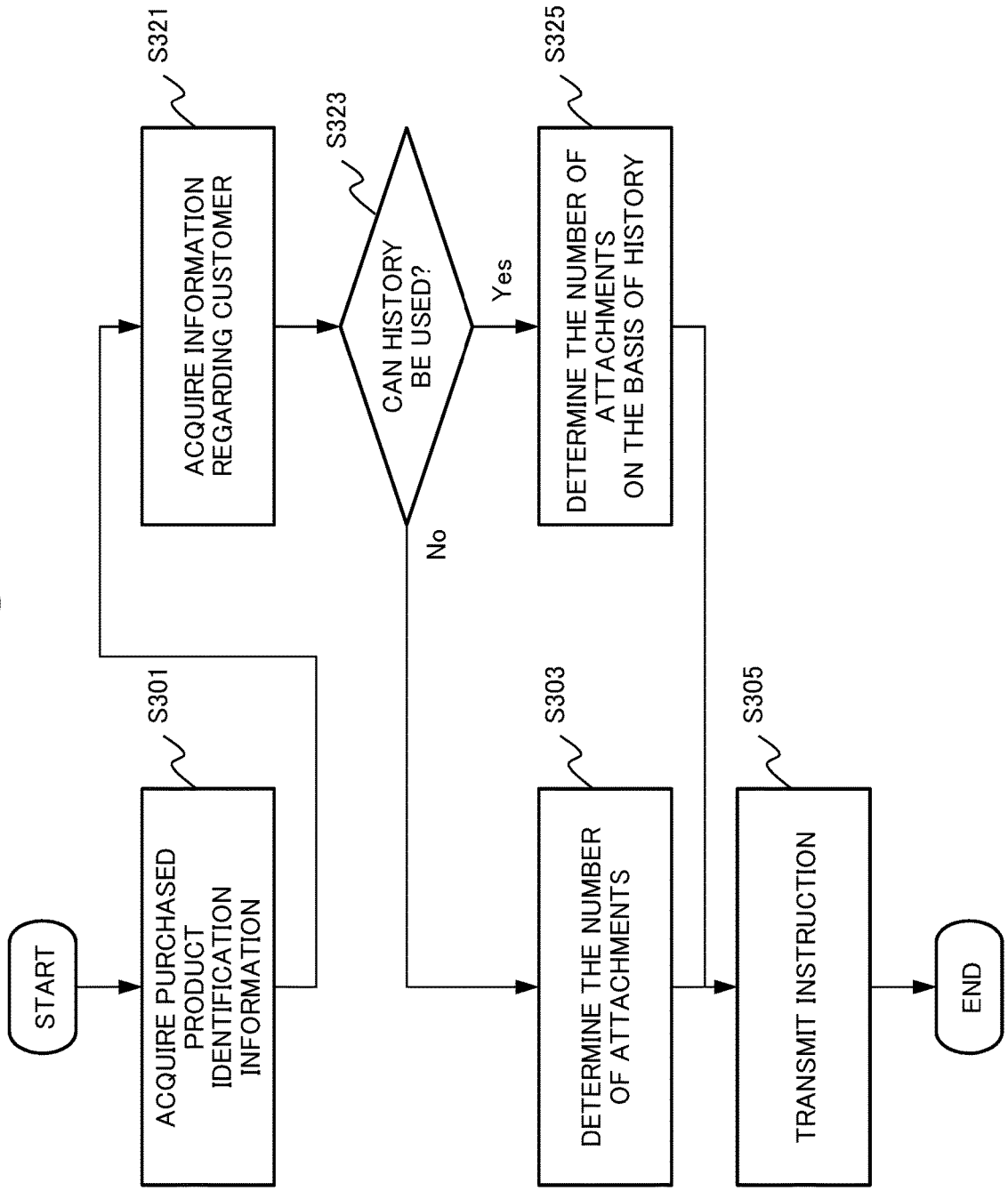
FIG. 9 is a flowchart illustrating an operation of an attachment provision control device according to the third example embodiment.

FIG. 9 is a flowchart illustrating the operation of the attachment provision control device 103 according to the third example embodiment.

The product information acquisition unit 120 of the attachment provision control device 103 acquires purchased product identification information related to a purchased product from the product identification device 210 (step S301).

The customer information acquisition unit 170 acquires information regarding a customer from the customer identification device 250 (step S321).

The attachment determination unit 132 determines whether a history can be used (step S323). Specifically, the attachment determination unit 132 determines whether the attachment history information 181 includes a pair of the purchased product and the customer.

In a case where the history can be used (Yes in step S323), the attachment determination unit 132 determines the number of attachments on the basis of the history (step S325). More specifically, the attachment determination unit 132 determines the number of attachments by using the attachment history information 181, the purchased product identification information, and the information regarding the customer.

In a case where it is not possible to use the history (No in step S323), the attachment determination unit 132 determines the number of attachments as in the first example embodiment (step S303). Specifically, the attachment determination unit 132 determines the number of attachments by using the attachment information 111 stored in the storage unit 110 and the received purchased product identification information.

Then, the transmission unit 140 transmits an instruction to provide at least one of the determined number of attachments and the determined amount of attachments to the attachment provision device 220 (step S305).

As described above, the operation of the attachment provision control device 103 according to the third example embodiment is completed.

The attachment provision device 220 provides the received number of attachments.

Next, an effect of the third example embodiment will be described.

According to the third example embodiment, an effect for providing the attachment suitable for the customer can be achieved, in addition to the effect of the first example embodiment.

The reasons are as follows.

The storage unit 180 (second storage unit) stores the attachment history information 181 that is information in which the customer, the product purchased by the customer, the attachment provided when the product is purchased, and at least one of the number and the amount of attachments are associated with each other. The customer information acquisition unit 170 acquires information regarding a customer who purchases a purchased product. The attachment determination unit 132 determines an attachment associated to the purchased product and at least one of the number and the amount of attachments for each customer on the basis of the acquired customer, the purchased product, and the attachment history information 181.

The attachment provision control device 103 can provide the attachment associated to the history of the customer on the basis of the above configuration.

In a case where the attachment provision control device 103 has a function of the attachment provision control device 102 for controlling the display of the attachments, the attachment provision control device 103 may display at least one of the number and the amount of attachments suitable for the customer.

Moreover, in a case where the attachment provision control device 103 has a function of the attachment provision control device 102 for changing the attachment or the like, the attachment provision control device 103 may update the attachment history information 181 by using information regarding the changed attachment or the like.

(Hardware Configuration)

In each example embodiment described above, each component of each device (attachment provision control devices 100 to 103) indicates a block in a functional unit. Some or all of the components of each device may be implemented by any combination of a computer and a program.

Figure 10:
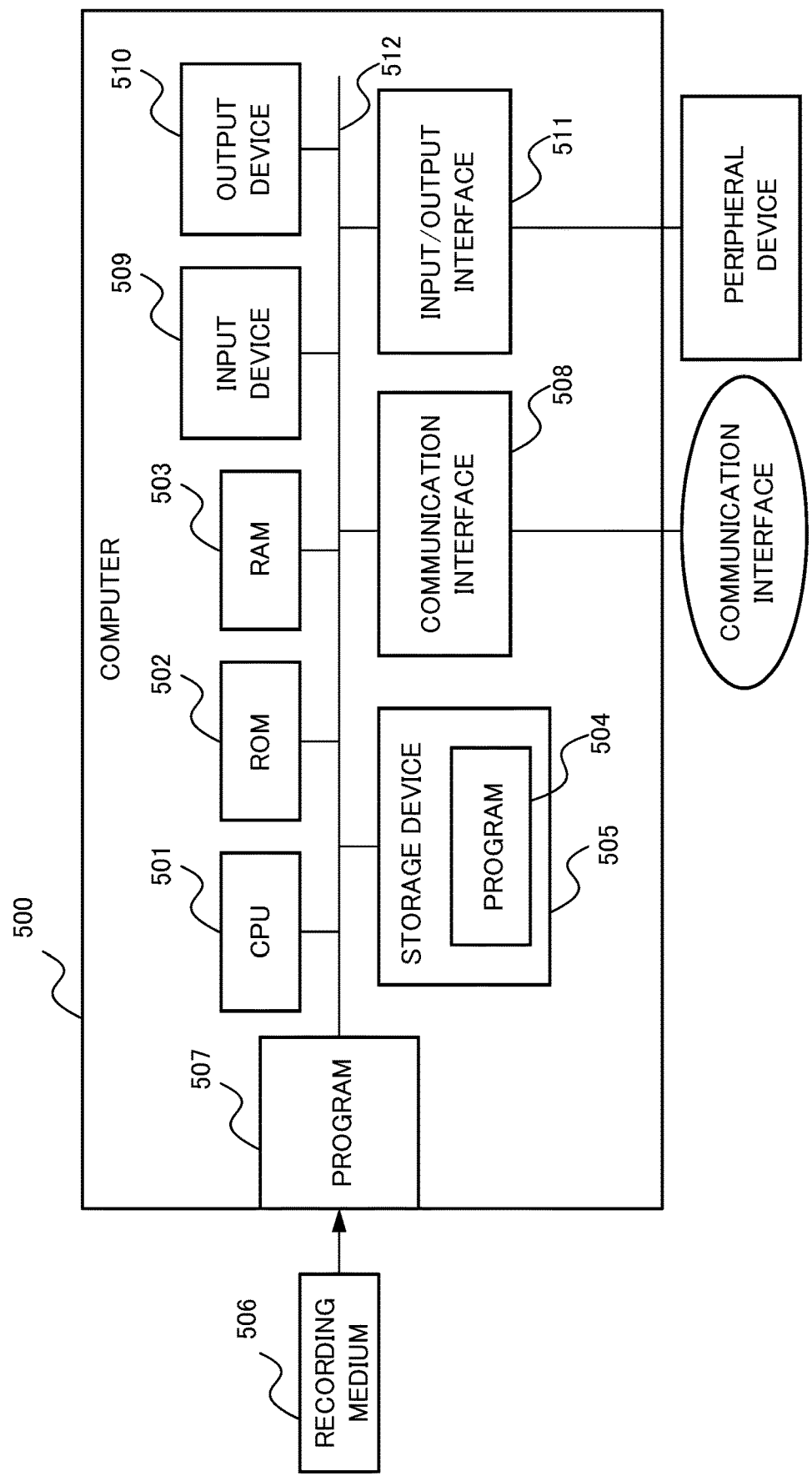
FIG. 10 is a block diagram illustrating an example of a hardware configuration of a computer.

FIG. 10 is a block diagram illustrating an example of a hardware configuration of a computer 500.

Referring to FIG. 10, the computer 500 includes a central processing unit (CPU) 501 that is an example of a processor. Moreover, the computer 500 includes a read only memory (ROM) 502 and a random access memory (RAM) 503 that are examples of a memory. The computer 500 further includes a program 504, a storage device 505, a drive device 507, a communication interface 508, an input device 509, an output device 510, an input/output interface 511, and a bus 512.

The program 504 includes a command (instruction) to implement each function of each device. The program 504 is stored in at least one of the ROM 502, the RAM 503, and the storage device 505 in advance.

The CPU 501 implements each function of each device by executing the command included in the program 504. For example, by executing the command included in the program 504 by the CPU 501 of the attachment provision control device 100, the computer 500 implements the functions as the product information acquisition unit 120, the attachment determination unit 130, and the transmission unit 140.

In addition to the program 504, the ROM 502 stores data that is required to be stored in each function of each device in advance, such as an initial value.

In addition to the program 504, the RAM 503 stores data that is temporarily stored in each function of each device.

For example, the RAM 503 of the attachment provision control device 100 may store the acquired purchased product.

In addition to the program 504, the storage device 505 stores a large amount of data that cannot be stored in the ROM 502 and the RAM 503. Moreover, the storage device 505 may store at least one of data saved for a long period and data that is changed at a low frequency. For example, the storage device 505 of the attachment provision control device 100 operates as the storage unit 110. Alternatively, the storage device 505 of the attachment provision control device 103 operates as the storage units 110 and 180.

A recording medium 506 records data used by the computer 500. The recording medium 506 may record data acquired by the computer 500.

The drive device 507 reads the data recorded in the recording medium 506. Moreover, the drive device 507 may write data into the recording medium 506.

The recording medium 506 may further include at least a part of the program 504. In this case, the program 504 recorded in the recording medium 506 may be read by the drive device 507, stored in the RAM 503 or the storage device 505, and supplied to the CPU 501.

The ROM 502, the storage device 505, and the recording medium 506 are examples of a non-transitory recording medium.

The communication interface 508 provides an interface with a communication network. For example, the communication interface 508 of the attachment provision control device 100 may operate as a part of at least one of the product information acquisition unit 120 and the transmission unit 140. Alternatively, for example, the communication interface 508 of the attachment provision control device 102 may operate as a part of at least one of the display control unit 150 and the instruction acquisition unit 160. Alternatively, for example, the communication interface 508 of the attachment provision control device 103 may operate as a part of the customer information acquisition unit 170.

The program 504 may be supplied from a device (not illustrated) connected to the communication network via the communication interface 508 to the computer 500.

The input device 509 is, for example, a mouse and a keyboard and receives an input of information from an administrator of the computer 500 or the like. For example, the input device 509 of the attachment provision control device 102 may operate as a part of at least one of the instruction acquisition unit 160 and the input unit 240.

The output device 510 is, for example, a display, and outputs (display) information to the administrator or the like. For example, the output device 510 of the attachment provision control device 102 may operate as a part of at least one of the display control unit 150 and the display unit 230.

The input/output interface 511 provides an interface with peripheral devices. For example, the input/output interface 511 of the attachment provision control device 102 may operate as a part of the display control unit 150 and the instruction acquisition unit 160.

The bus 512 connects the components of the hardware described above.

The hardware configuration illustrated in FIG. 10 is an example. The computer 500 may include a component other than those described above and does not need to include some of the components described above.

(Modification)

There are various modifications of the method for implementing each device. For example, the components of each device may be implemented by any combination of computers and programs different for the respective devices.

Alternatively, a plurality of components included in each device may be implemented by any combination of a single computer and a program.

Alternatively, some or all of the components of each device may be implemented by a general-purpose circuitry or dedicated circuit including a processor or the like and a combination thereof.

The circuit may include a single chip or include a plurality of chips connected via a predetermined bus.

Some of all of the components of each device may be implemented by a combination of the circuit or the like and the program.

In a case where some or all of the components of each device are implemented by a plurality of computers, circuits, or the like, the plurality of computers, circuits, or the like may be centrally or dispersedly arranged.

Each device of each example embodiment may be disposed in a store or may be disposed in a place different from the store and connected to a device (for example, POS terminal or store server) of the store via a communication network. That is, each device may be implemented by a cloud computing system.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure. The components of each example embodiment can be combined with each other without departing from the scope of the present disclosure.

Although some or all of the example embodiments may be described as supplementary notes below, some or all of the example embodiments are not limited to the following supplementary notes.

(Supplementary Note 1)

An attachment provision control device including:
 a memory; and
 at least one processor coupled to the memory,
 the processor performing operations, the operations including:
 acquiring information related to a purchased product and at least one of a purchase quantity and a purchase amount of the purchased product;
 determining at least one of a number and an amount of attachments to be attached to the purchased product based on the information related to the purchased product and at least one of the purchase quantity and the purchase amount of the purchased product; and
 transmitting an instruction to provide at least one of the determined number of attachments or the determined amount of attachments to an attachment provision device.

(Supplementary Note 2)

The attachment provision control device according to supplementary note 1, wherein the instructions further include:
 making a display unit of the attachment provision device display at least one of the determined number and amount of attachments;
 acquiring an instruction related to at least one of provision of the displayed attachment, a change of the attachment, an increase in the attachment, and a reduction in the attachment from a customer who purchases the purchased product; and determining at least one of the number and the amount of attachments based on the acquired instruction.

(Supplementary Note 3)

The attachment provision control device according to supplementary note 2, wherein the instructions further include:
in a case where at least one of the number and the amount of attachments is a predetermined number,
stopping display related to the increase in the attachment on the display unit, or
stopping the acquisition of the instruction related to the increase in the attachment.

(Supplementary Note 4)

The attachment provision control device according to supplementary note 2 or 3, wherein the instructions further include:
in a case where at least one of a movement of the customer who has purchased the purchased product and detection of another customer is detected, returning the display unit to an initial state including at least one of display of an initial screen and turning off a light.

(Supplementary Note 5)

The attachment provision control device according to any one of supplementary notes 2 to 4, wherein the instructions further include:
in a case where an operation is not detected within a predetermined time from start of the display related to the increase in the attachments on the display unit, retuning the display unit to the initial state including at least one of the display of the initial screen and turning off a light.

(Supplementary Note 6)

The attachment provision control device according to any one of supplementary notes 2 to 5, wherein the operations further includes:
acquiring information regarding the customer who purchases the purchased product,
determining the attachment associated to the purchased product and at least one of the number and the amount of attachments based on the acquired information regarding the customer and the purchased product, and
displaying at least one of the determined number and the determined amount of attachments.

(Supplementary Note 7)

The attachment provision control device according to supplementary note 6, wherein the instructions further include:
updating attachment history information based on the acquired information regarding the customer and the acquired instruction.

(Supplementary Note 8)

An attachment provision system including:
an attachment provision control device including:
a memory; and
at least one processor coupled to the memory,
the processor performing operations, the operations including:
acquiring information related to a purchased product and at least one of a purchase quantity and a purchase amount of the purchased product;
determining at least one of a number and an amount of attachments to be attached to the purchased product based on the information related to the purchased product and at least one of the purchase quantity and the purchase amount of the purchased product; and
transmitting an instruction to provide at least one of the determined number of attachments or the determined amount of attachments to an attachment provision device;
the attachment provision device configured to provide the attachment based on the instruction received from the attachment provision control device; and
a product identification device configured to identify the purchased product and at least one of the purchase quantity and the purchase amount of the purchased product and transmit the information related to the purchased product and at least one of the purchase quantity and the purchase amount of the purchased product to the attachment provision control device.

(Supplementary Note 9)

An attachment provision control method including:
acquiring information related to a purchased product and at least one of a purchase quantity and a purchase amount of the purchased product;
determining at least one of a number and an amount of attachments to be attached to the purchased product based on the information related to the purchased product and at least one of the purchase quantity and the purchase amount of the purchased product; and
transmitting an instruction to provide at least one of the determined number of attachments or the determined amount of attachments to an attachment provision device.

(Supplementary Note 10)

An attachment provision method, in which
an attachment provision control device
acquires information related to a purchased product and at least one of a purchase quantity and a purchase amount of the purchased product,
determines at least one of a number and an amount of attachments to be attached to the purchased product based on the information related to the purchased product and at least one of the purchase quantity and the purchase amount of the purchased product, and
transmits an instruction to provide at least one of the determined number of attachments or the determined amount of attachments to an attachment provision device;
the attachment provision device
provides the attachment based on the instruction received from the attachment provision control device; and
a product identification device
identifies the purchased product and at least one of the purchase quantity and the purchase amount of the purchased product and
transmits the information related to the purchased product and at least one of the purchase quantity and the purchase amount of the purchased product to the attachment provision control device.

(Supplementary Note 11)

A non-transitory computer-readable recording medium that embodies a program. The program causes a computer to perform a method. The method include:
acquiring information related to a purchased product and at least one of a purchase quantity and a purchase amount of the purchased product;
determining at least one of a number and an amount of attachments to be attached to the purchased product based on the information related to the purchased product and at least one of the purchase quantity and the purchase amount of the purchased product; and transmitting an instruction to provide at least one of the determined number of attachments or the determined amount of attachments to an attachment provision device.

This application is based upon and claims the benefit of priority from Japanese patent application No. 2019-048564, filed on Mar. 15, 2019, the disclosure of which is incorporated herein in its entirety by reference.

REFERENCE SIGNS LIST 10 attachment provision system
11 attachment provision system
12 attachment provision system
100 attachment provision control device
101 attachment provision control device
102 attachment provision control device
103 attachment provision control device
110 storage unit
111 attachment information
120 product information acquisition unit
130 attachment determination unit
131 attachment determination unit
132 attachment determination unit
140 transmission unit
150 display control unit
160 instruction acquisition unit
170 customer information acquisition unit
180 storage unit
181 attachment history information
210 product identification device
220 attachment provision device
221 attachment provision device
230 display unit
240 input unit
250 customer identification device
500 computer
501 CPU
502 ROM
503 RAM
504 program
505 storage device
506 recording medium
507 drive device
508 communication interface
509 input device
510 output device
511 input/output interface
512 bus

What is claimed is:

1. An attachment provision control device comprising:
a memory; and
at least one processor coupled to the memory,
the processor performing operations, the operations comprising:
acquiring information related to a purchased product and at least one of a purchase quantity and a purchase amount of the purchased product;
determining at least one of a number and an amount of attachments to be attached to the purchased product based on the information related to the purchased product and at least one of the purchase quantity and the purchase amount of the purchased product; and
transmitting an instruction to provide at least one of the determined number of attachments or the determined amount of attachments to an attachment provision device.

2. The attachment provision control device according to claim 1, wherein the instructions further comprise:
making a display unit of the attachment provision device display at least one of the determined number and amount of attachments;
acquiring an instruction related to at least one of provision of the displayed attachment, a change of the attachment, an increase in the attachment, and a reduction in the attachment from a customer who purchases the purchased product; and
determining at least one of the number and the amount of attachments based on the acquired instruction.

3. The attachment provision control device according to claim 2, wherein the instructions further comprise:
in a case where at least one of the number and the amount of attachments is a predetermined number,
stopping display related to the increase in the attachment on the display unit, or
stopping the acquisition of the instruction related to the increase in the attachment.

4. The attachment provision control device according to claim 2, wherein the instructions further comprise:
in a case where at least one of a movement of the customer who has purchased the purchased product and detection of another customer is detected, returning the display unit to an initial state including at least one of display of an initial screen and turning off a light.

5. The attachment provision control device according to claim 2, wherein the instructions further comprise:
in a case where an operation is not detected within a predetermined time from start of the display related to the increase in the attachments on the display unit, returning the display unit to the initial state including at least one of the display of the initial screen and turning off a light.

6. The attachment provision control device according to claim 2, wherein the operations further comprise:
acquiring information regarding the customer who purchases the purchased product,
determining the attachment associated to the purchased product and at least one of the number and the amount of attachments based on the acquired information regarding the customer and the purchased product, and
displaying at least one of the determined number and the determined amount of attachments.

7. The attachment provision control device according to claim 6, wherein the instructions further comprise:
updating attachment history information based on the acquired information regarding the customer and the acquired instruction.

8. An attachment provision control method comprising:
acquiring information related to a purchased product and at least one of a purchase quantity and a purchase amount of the purchased product;
determining at least one of a number and an amount of attachments to be attached to the purchased product based on the information related to the purchased product and at least one of the purchase quantity and the purchase amount of the purchased product; and
transmitting an instruction to provide at least one of the determined number of attachments or the determined amount of attachments to an attachment provision device.

9. A non-transitory computer-readable recording medium embodying a program, the program causing a computer to perform a method, the method comprising:

acquiring information related to a purchased product and at least one of a purchase quantity and a purchase amount of the purchased product;

determining at least one of a number and an amount of attachments to be attached to the purchased product based on the information related to the purchased product and at least one of the purchase quantity and the purchase amount of the purchased product; and transmitting an instruction to provide at least one of the determined number of attachments or the determined amount of attachments to an attachment provision device.

\* \* \* \* \*